US00RE35533E

United States Patent [19]

Adamek et al.

[11] E Patent Number: Re. 35,533

[45] Reissued Date of Patent: Jun. 17, 1997

[54] DOUBLE LOBE TUBULAR CONNECTOR CLAMP

[75] Inventors: Frank C. Adamek, Pasadena; Dag H. Zeiner-Gundersen, Houston, both of Tex.

[73] Assignee: ABB Vetco Gray Inc., Houston, Tex.

[21] Appl. No.: 181,325

[22] Filed: Jan. 14, 1994

(Under 37 CFR 1.47)

Related U.S. Patent Documents

Reissue of:

[64] Patent No.: 5,080,400
Issued: Jan. 14, 1992
Appl. No.: 516,725
Filed: Apr. 30, 1990

[51] Int. Cl.[6] ..... F16L 55/00

[52] U.S. Cl. ..... 285/23; 285/334.2; 285/367

[58] Field of Search ..... 285/367, 334.2, 285/23, 315, 320, 323, 394

[56] References Cited

U.S. PATENT DOCUMENTS

| | | | |
|---|---|---|---|
| 1,227,187 | 5/1917 | Olcott . | |
| 1,839,761 | 1/1932 | Hutton . | |
| 1,931,694 | 10/1933 | Hall . | |
| 2,488,470 | 11/1949 | Gerweck et al. | 285/23 |
| 2,766,998 | 10/1956 | Watts et al. . | |
| 2,768,841 | 10/1956 | Allen . | |
| 3,006,663 | 10/1961 | Bowne . | |
| 3,216,746 | 11/1965 | Watts . | |
| 3,321,217 | 5/1967 | Ahlstone | 285/334.2 |
| 3,393,927 | 7/1968 | Kelley et al. . | |
| 3,404,902 | 10/1968 | Latham et al. . | |
| 3,554,581 | 1/1971 | Mason et al. . | |
| 3,680,188 | 8/1972 | Mason et al. . | |
| 3,687,487 | 8/1972 | Lindholm | 285/373 X |
| 4,059,288 | 11/1977 | Mohr | 285/23 X |
| 4,248,307 | 2/1981 | Silberman et al. | 285/23 X |
| 4,311,248 | 1/1982 | Westerlund et al. | 285/365 X |
| 4,496,172 | 1/1985 | Walker | 285/315 |
| 4,522,434 | 6/1985 | Webb . | |
| 4,557,508 | 12/1985 | Walker | 285/315 |
| 4,601,495 | 7/1986 | Webb . | |
| 4,693,497 | 9/1987 | Pettus et al. | 285/315 |

FOREIGN PATENT DOCUMENTS

| | | | |
|---|---|---|---|
| 0511690 | 12/1953 | Belgium | 285/407 |
| 0013074 | 9/1925 | Netherlands | 285/365 |
| 0370439 | 4/1932 | United Kingdom | 285/367 |
| 0840696 | 7/1960 | United Kingdom | 285/367 |

*Primary Examiner*—Dave W. Arola
*Assistant Examiner*—Heather Shackelford
*Attorney, Agent, or Firm*—James E. Bradley

[57] ABSTRACT

A hub clamp will be used to connect two conduits together in end-to-end relationship. Each conduit has a pair of generally parallel load shoulders that extend around the conduit and are axially spaced from each other. The clamp has two sets of load shoulders, one for engaging each set of load shoulders on each end of the conduit. The clamp is in two halves, and when bolted together, draws the ends of the conduits toward each other. Each load shoulder is separated by a flank. The two flanks of the mating load shoulders are separated by a gap when fully made up. The first load shoulder of each conduit has multiple angled sections. The load section is at a greater angle than the load section relative to a plane perpendicular to the longitudinal axis of the conduit. The clamp will be mounted releasably to an upper conduit so that it can slide inward and outward, for vertical conduit applications.

15 Claims, 7 Drawing Sheets

DOUBLE LOBE TUBULAR CONNECTOR CLAMP

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates in general to connection means for tubular connectors, and in particular to a clamp type connector for use in oil field applications.

2. Description of the Prior Art

Releasable pipe connection joints are used in many oil field applications. Applications include pipes for valve assemblies, wellheads, and other pressure vessels. One type of well known pipe connector is illustrated in U.S. Pat. Nos. 3,216,746, Watts, Nov. 9, 1965 and 3,404,902, R. E. Latham, et al. Oct. 8, 1968. In these connectors, each conduit or pipe has an external flange on its end. The flange is conical in cross-section. The clamp is in two halves. The clamp has mating conical surfaces for clamping the pipe ends together. A T-shaped seal locates between the abutting ends. Bolts draw the clamp together to pre-load the connections.

While these clamp type connectors work well, it would be desirable to reduce the mechanical stresses in the connection. This would enable the clamp connection to be made smaller and lighter.

Also, in drilling and production applications, there are instances where large, heavy conduits must be connected together, and wherein considerable axial distance must be covered during the makeup. This occurs in wellhead housings that locate on top of the well. There are different types of connectors. One type utilizes dogs which are forced into grooves on the wellhead housing profile. The grooves on the profile have conical load shoulders formed at a single angle. In some instances, the dogs may have a lead-in angle formed on the edge to increase the axial drawdown. It is desirable to provide a clamp type connector that would provide a large axial drawdown as the clamp is being made up, then provide a large axial pre-load in the final stages of make up.

SUMMARY OF THE INVENTION

In this invention, a clamp type connector is provided that has two semi-circular halves clamping the ends of the conduits together. The ends of the conduits have dual lobes or load shoulders. These load shoulders are axially spaced apart from each other. The clamp has mating conical load shoulders for engaging the other load shoulders. The load shoulders of the clamp and the conduits are separated by flanks which face in opposite directions. When made up, the clamp flanks will be separated from the conduit flanks by a significant gap. This assures that the desired amount of axial pre-load is applied. The minimum and maximum gap is a function of the diameter of the conduit ends.

In the second embodiment of the invention, the load shoulders spaced closest to the ends of the conduits are formed with multiple angles. Similarly, the mating conduit shoulders are formed with multiple angles. The first portion, which is the entry or lead portion, is at a greater angle relative to a plane perpendicular to the axis than the second portion, which is the load portion. The lead portions slide together to provide a significant amount of axial travel during this sliding movement. This provides good axial drawdown. The load portions, when sliding together, provide much less axial movement, but a much greater axial pre-load.

Also, when used in vertical applications, the clamp halves will be mounted to the upper conduit. The mounting means allows the clamp halves to slide readily inward and outward during the clamping movement.

DETAILED DESCRIPTION OF THE INVENTION

Figure 1:
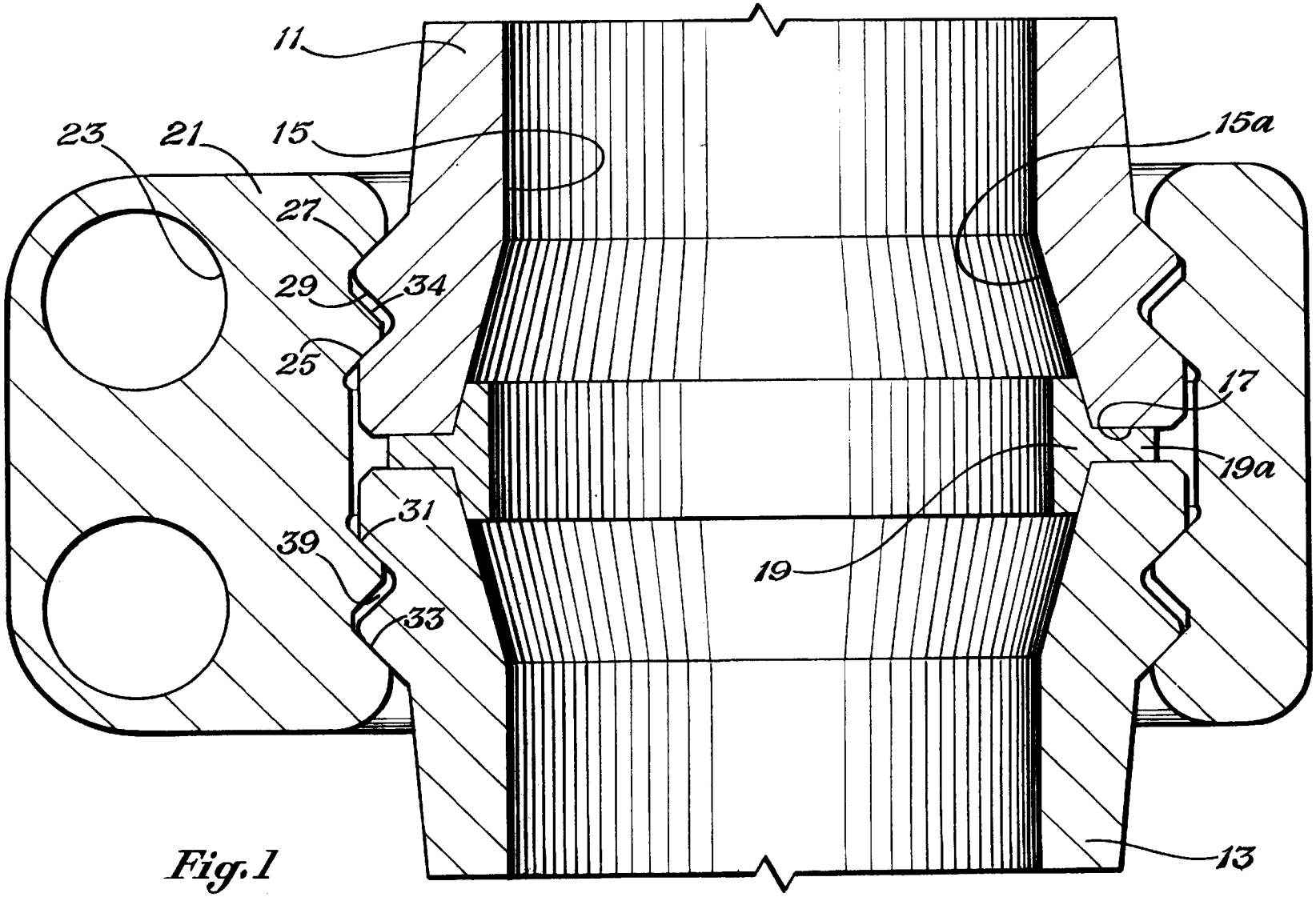
FIG. 1 is a vertical cross-sectional view of a connection means constructed in accordance with this invention.

Referring to FIG. 1, two pipes or conduits 11, 13 will be connected together in an end-to-end relationship. Each conduit 11, 13 has an axial bore 15. The bore 15 has a forward portion 15a that is conical. Each conduit 11, 13 has an end 17 that opposes the end 17 of the other conduit 11, 13. A T-shaped seal 19 locates between the ends 17. The seal 19 has a web 19a that will be compressed by the ends 17. The ends 17 do not actually touch each other.

Clamp 21 is generally formed in two semi-circular halves. Clamp 21 has on one side a pair of holes 23 for receiving bolts (not shown) for bolting the halves of the clamp 21 together. Clamp 21, when bolted together, secures the conduits 11, 13 together in an axial pre-load.

Each conduit 11, 13 has first and second load shoulders 25, 27. The load shoulders 25, 27 are conical and are formed on the exterior of the conduits 11, 13. The first load shoulder 25 will be spaced closer to the end 17 than the second load shoulder 27. The load shoulders 25, 27 are preferably parallel and intersect the longitudinal axis of the conduits 11, 13 at an angle of about 70 degrees. A flank 29 separates the two load shoulders 25, 27. Flank 29 is also conical, and is shown in the embodiment of FIG. 1 to be about the same angle as the load shoulders 25, 27, but facing about 90 degrees away.

The clamp 21 has two sets of load shoulders 31, 33 for engaging the load shoulders 25, 27 of each conduit 11, 13. The first load shoulder 31 will engage the first load shoulders 25. Each second load shoulder 33 will engage a second load shoulder 27. Load shoulders 31, 33 will be formed at the same angle and have the same dimensions as the load shoulders 25, 27. A flank 34 is formed between the load shoulders 31, 33. Flank 34 will be parallel to the flank 29.

Figure 2:
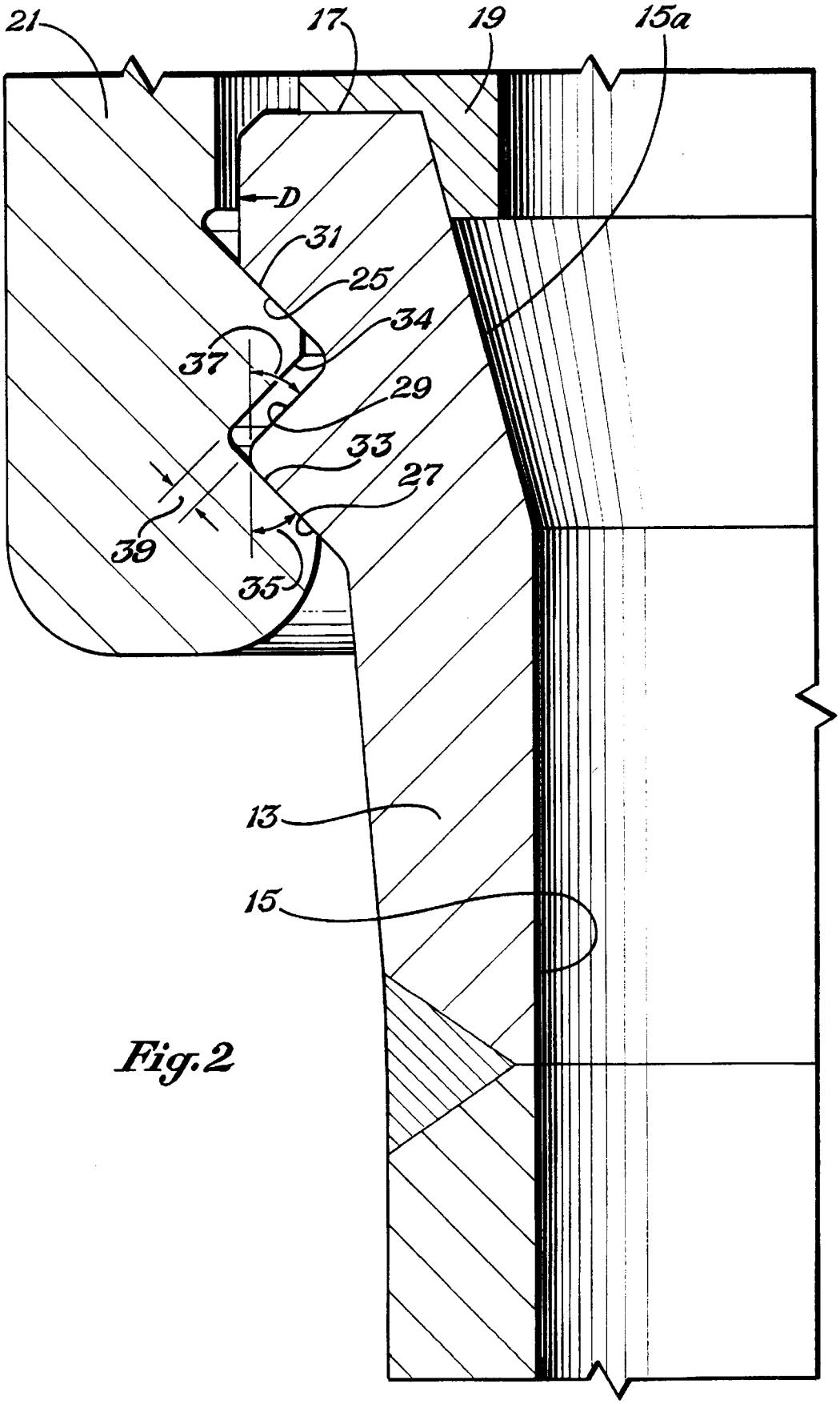
FIG. 2 is an enlarged view of a portion of the connection means of FIG. 1.

FIGS. 1 and 2 show the clamp 21 in a fully made up position. Referring to FIG. 2, the first and second load shoulders 25, 27 will be located at an angle 35 relative to the longitudinal axis that could be from 30 to almost 90 degrees, but is preferably around 70 degrees. Also, in this embodiment, the first and second load shoulders 25, 27 are at the same angle 35. The flanks 29, 34 are at an angle 37 that could be from 15 degrees to almost 95 degrees, but preferably is about 45 degrees.

Figure 3:
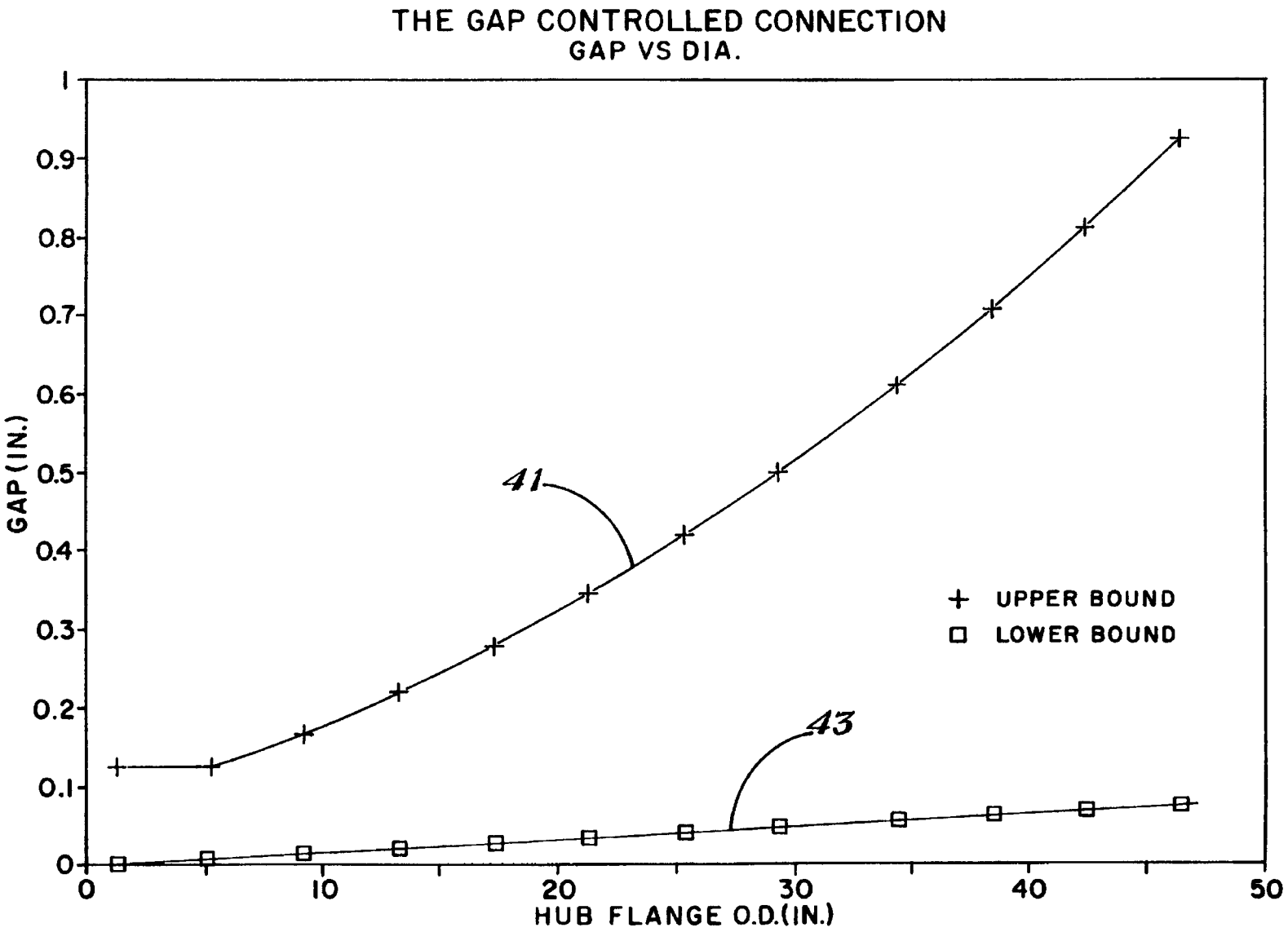
FIG. 3 is a graph illustrating the maximum and minimum gaps employed with the connection means of FIG. 1.

The dimensions and positioning of the load shoulders 25, 27 and 31, 33 will be selected so that when fully made up, a gap 39 exists between the flanks 29, 34. This gap 39 assures that the desired amount of axial pre-load will be reached. If the flanks 29, 34 abutted each other, it would be possible for the connection to be fully made up without the desired mount of pre-load. FIG. 3 illustrates the desired amount of gap for a given diameter D (FIG. 2). the diameter D is the outer diameter of the conduit 11 or 13 at the end 17. The curve 41 illustrates the maximum gap that is acceptable. The curve 43 indicates the minimum gap that is acceptable. A mathematical relationship has been derived for maximum and minimum gaps. The relationships are as follows:

the maximum gap=0.1056[exp((In D—0.8324)sq/4.134)];

the minimum gap=0.0000009562 [exp((In D+14.16)sq/28.85)];

The symbol "sq" means squared, while D is the outer diameter previously mentioned. The other symbols are standard mathematical terms.

In the operation of the embodiment of FIGS. 1–3, the seal 19 will be placed between the ends 17 of the conduits 11, 13. The halves of the clamp 21 will be placed around the conduits 11, 13. The clamp load shoulders 31, 33 will engage the conduit load shoulders 25, 27. Bolts will be placed through the holes 23 and tightened. As the bolts are tightened, the load shoulders 31, 33 slide on the load shoulders 25, 27 respectively. When the proper amount of torque has been reached, the seal 19 will be properly compressed and the desired axial pre-load will exist. The gap 39 (FIG. 2) between the flanks 29, 34 will exist when the connection joint is fully made up.

Figure 4:
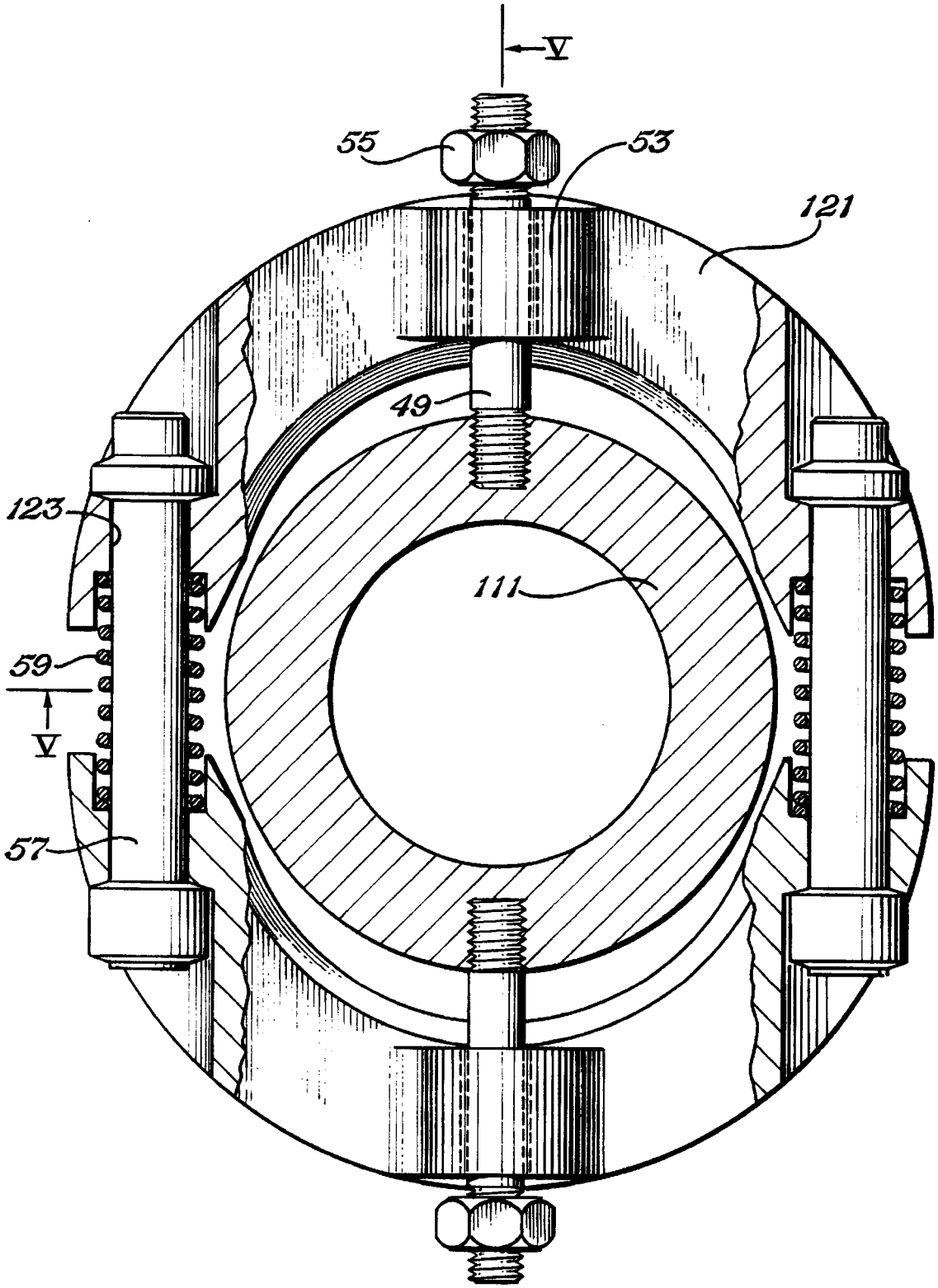
FIG. 4 is a first alternate embodiment of a connection means constructed in accordance with this invention, and shown in a transverse, partially sectioned view.
Figure 5:
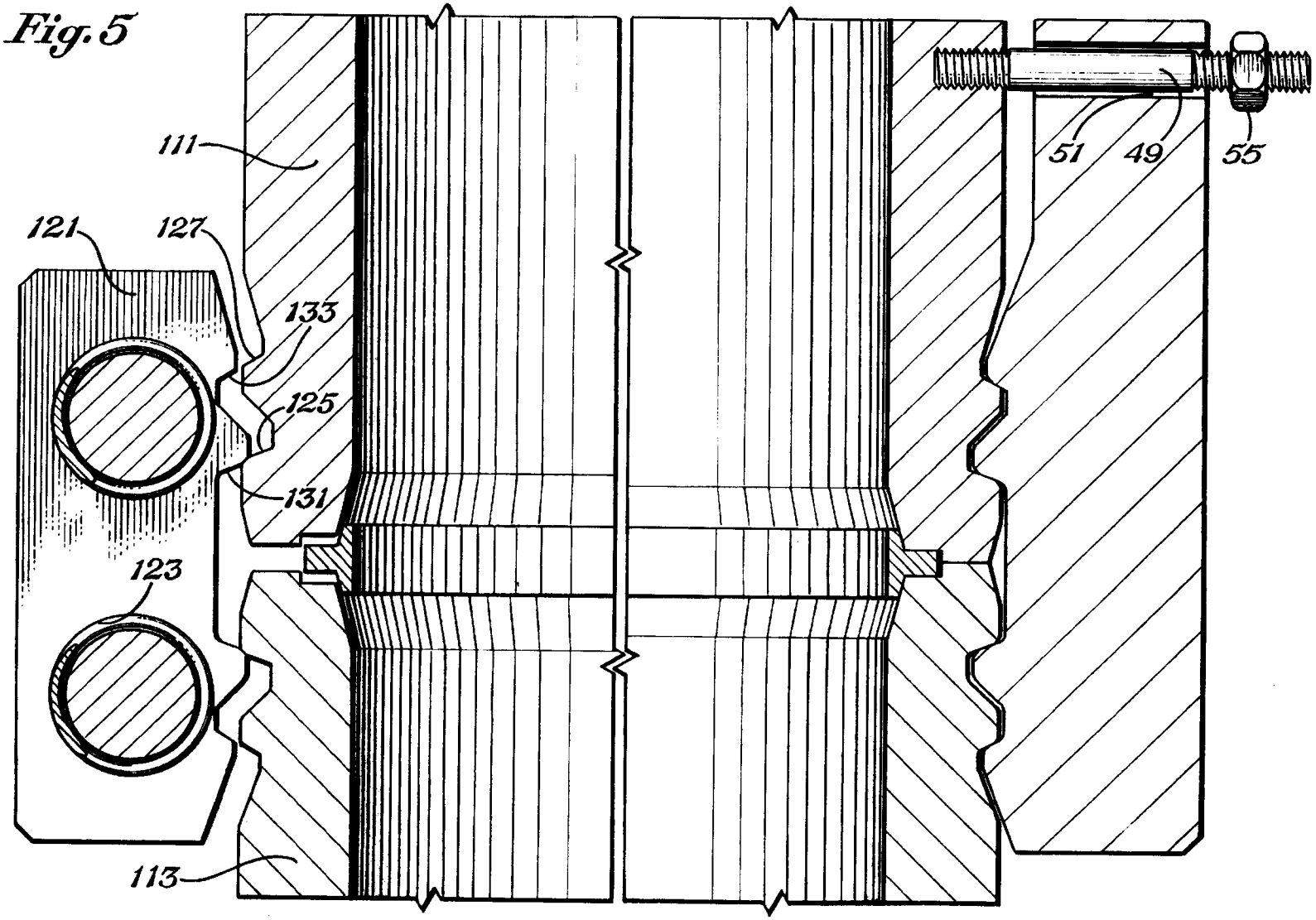
FIG. 5 is a vertical sectional view of the connection means of FIG. 4, shown along the lines V—V.
Figure 6:
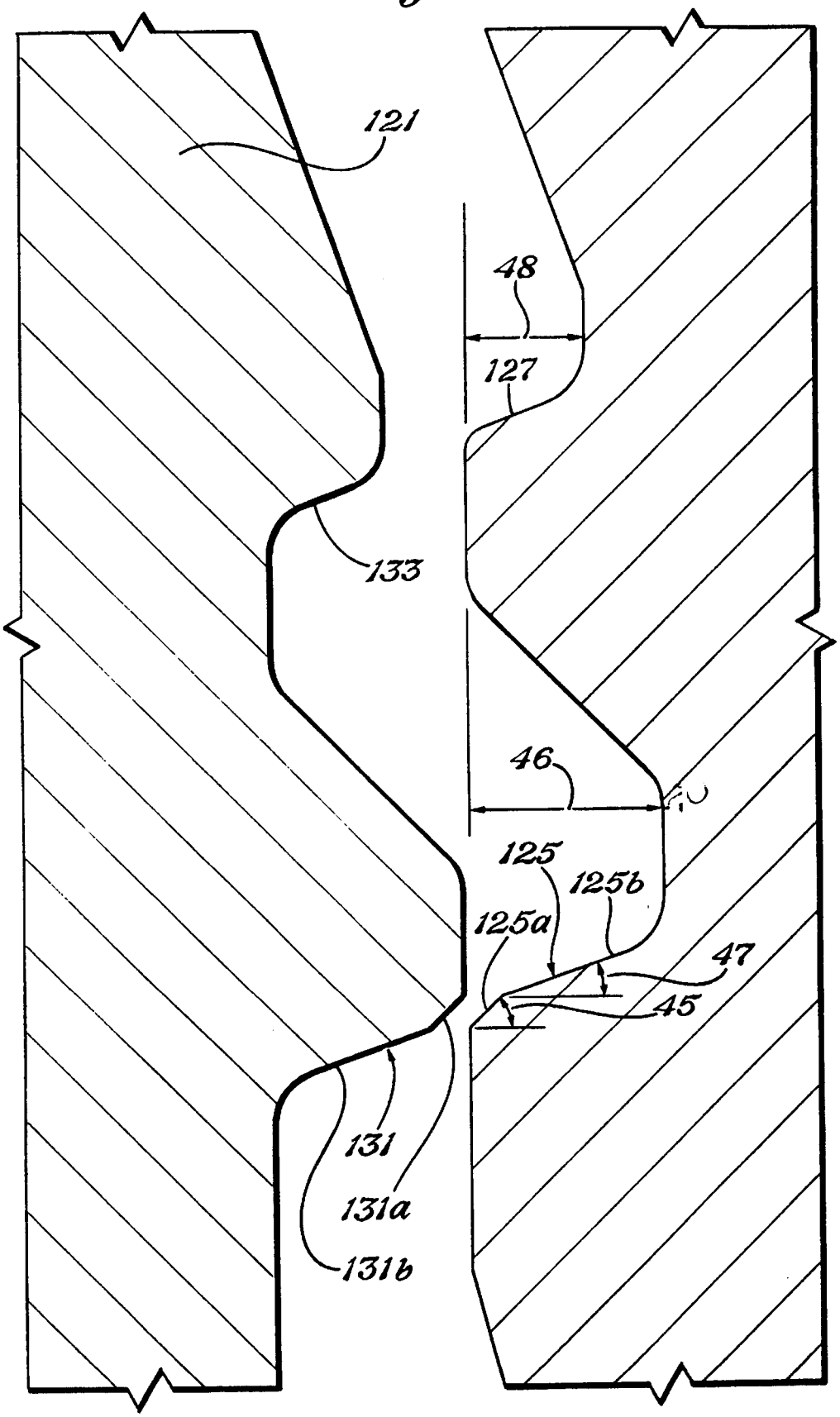
FIG. 6 is an enlarged vertical sectional view of the load shoulders of the connections means of FIG. 5.

Referring to FIGS. 4–6, and in particular to FIGS. 5 and 6, this second embodiment will be particularly for use in vertical applications. The conduit 111 will locate on top of the conduit 113. Conduit 113 may be a wellhead housing with conduit 111 being a tubular member that connects on top of the conduit 113. The clamp 121 will connect the conduits 111, 113 together. The conduits 111, 113 each have load shoulders 125, 127. Similarly, the clamp has two pairs of load shoulders 131, 133.

As shown in FIG. 6, in this embodiment, the first conduit load shoulder 125 has two separate portions 125a and 125b. The portion 125a is the lead portion and is located at the entrance to the load shoulder 125. It will be at an angle 45 that is in the range from about 20 degrees to 50 degrees relative to a plane perpendicular to the longitudinal axis of the conduit 111. In the embodiment shown, angle 45 is approximately 45 degrees. The second or load portion 125b is preferably only about 5 degrees to 30 degrees for angle 147. In the embodiment shown, angle 47 is about 15 degrees.

The lead and load portions 125a, 125b will be located only on the first load shoulder 125, not the second load shoulder 127. Also, preferably the first load shoulder 125 has a greater radial depth 46 than the depth 48 of the second load shoulder 127. The clamp first load shoulder 131 will have lead and load portions 131a and 131b which mate with the portions 125a, 125b. They will be formed at the same angles as the angles 45, 47.

Referring again to FIG. 5, each half of the clamp 121 will be supported on the upper conduit 111 by a supporting means. This includes in the embodiment of FIG. 5, a rod or bolt 49 which screws into a hole in the upper conduit 111. The bolt 49 extends radially outward. It extends loosely through a hole 51 provided in each half of the clamp 121. Hole 51 serves as cooperating means for allowing the halves of clamp 121 to move radially, inward and outward relative to the upper conduit 111. A nut 55 prevents the halves of the clamp 121 from sliding off of the bolts 49. As shown in FIG. 4, the hole 51 extends through a flange 53. Flange 53 is a lug type member integrally formed on the clamp 121 and extending upward.

The halves of the clamp 121 will be bolted together by bolts 57, as shown in FIG. 4. The bolts 37 extend through the holes 123 in the halves of the clamp 121. A spring 59 encircles each bolt 57 for urging the halves of the clamp 121 apart from each other.

In the operation of the embodiments of FIGS. 4–6, the halves of the clamp 121 will be mounted to the upper conduit 111 by the bolts 49. The halves of the clamp 121 will be spaced outward from the upper conduit 111 in the release position shown in FIG. 4, and in the left half of FIG. 5.

When it is desired to connect the upper conduit 111 to the lower conduit 113, the entire assembly will be lowered over the lower conduit 113. The clamp 121 will slide over the top of the lower conduit 113. Then, the operator will tighten the bolts 57. This draws the halves of the clamp 121 together to the position shown in the right half of FIG. 5. When bolting together, as illustrated in FIG. 6, the clamp lead portions 131a will slide on the conduit lead portions 125a. The large angle 45 creates a significant axial travel for each increment of sliding movement. The upper conduit 111 will move quickly axially downward toward the lower conduit 113.

Then, the load portions 131b will begin sliding on the load portions 125b. The smaller angle 47 creates less axial drawdown than the larger angle 45. However, it has a mechanical advantage of creating a much higher axial force than the lead portion 125a.

Figure 7:
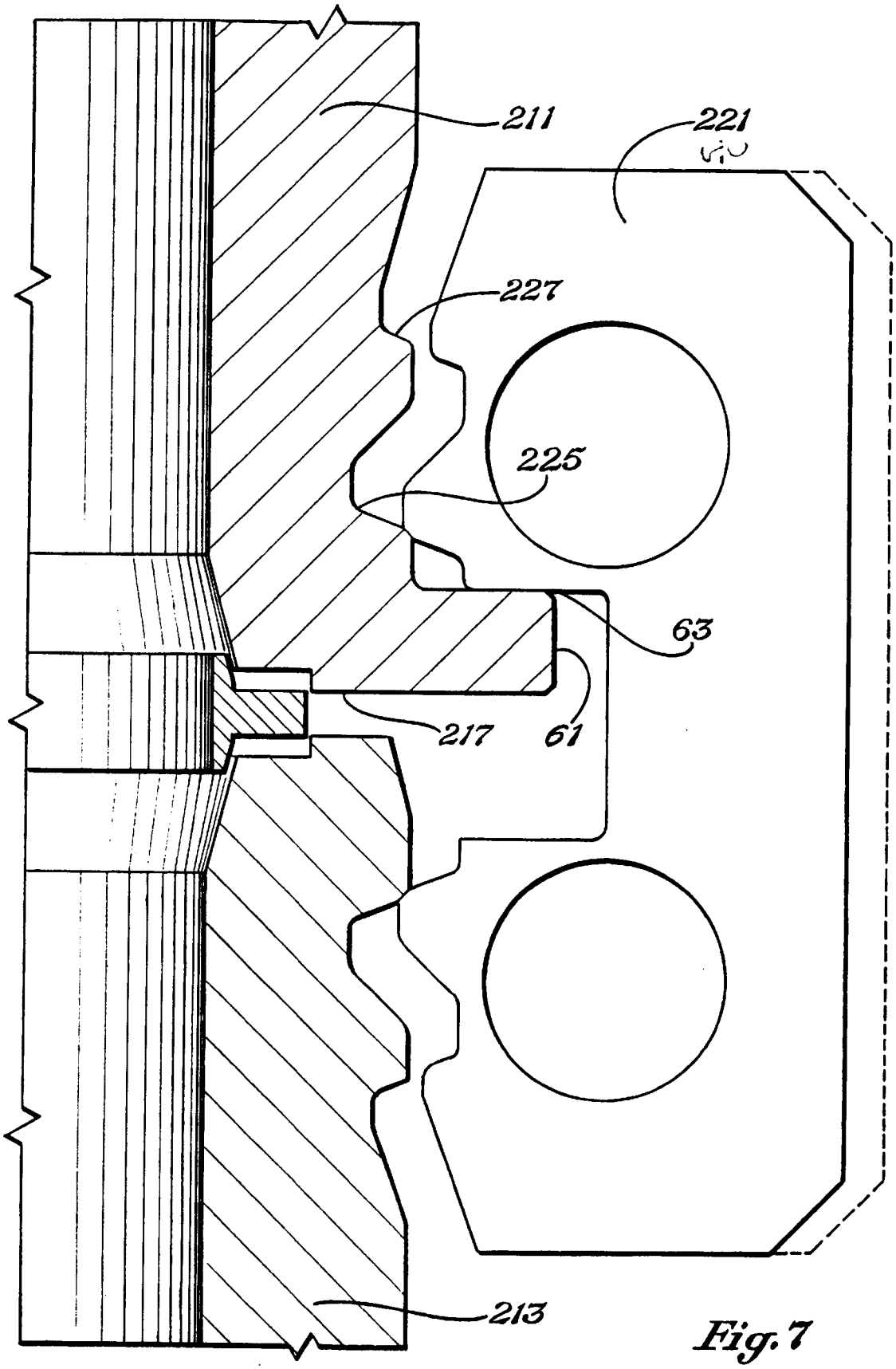
FIG. 7 is a second alternate embodiment of a connection means constructed in accordance with this invention, and shown in vertical cross section.

In the embodiment of FIG. 7, the only difference from the embodiment of FIGS. 4–6 is the means for retaining the halves of the clamp 221 to the upper conduit 211. In this instance, rather than a pair of bolts 49 (FIG. 5), a semi-circular flange 61 extends outward from the conduit 211. Flange 61 may be located on the lower end 217, or it may be located at a point above the load shoulders 225, 227. The clamp 221 will have a semi-circular slot 63 formed in it. The slot 63 will receive the protruding flange 61. Flange 61 and the slot 63 allow the clamp 21 to slide radially inward and outward when being bolted and unbolted.

The invention has significant advantages. The multiple load shoulders reduce the mechanical stresses in the connection over a single load shoulder clamp. This allows a lighter and smaller clamp. The gap between the flanks assures the desired amount of pre-load. The multiple angles on the first load shoulders provide a high axial drawdown and a high pre-load force as well. The carrying means provides convenience for carrying the clamp with the upper conduit in vertical applications.

While the invention has been shown in only three of its forms, it should be apparent to those skilled in the art that it is not so limited, but is susceptible to various changes without departing from the scope of the invention.

We claim:

1. Connection means for connecting two conduits together with their axes coinciding with each other and with their ends opposing each other and compressing a seal between them, the connection means comprising in combination:

a pair of axially spaced generally parallel conical conduit load shoulders formed on each conduit, each of the conduit load shoulders of each pair extending circumferentially around each of the conduits and being separated from the other conduit load shoulder of the pair by a conical conduit flank;

a clamp having two semi-circular halves for clamping the ends of the conduits together, each half of the clamp having two paris of axially spaced generally parallel conical clamp load shoulders for mating with the conduit load shoulders, each of the clamp load shoulders of each pair being separated from the other clamp load shoulder of the pair by a conical clamp flank;

means for bolting the halves of the clamp together for causing the clamp load shoulders to slide on the conduit load shoulders and draw the ends of the conduits toward each other, compressing the seal; and each of the clamp flanks being spaced from each of the conduit flanks by a gap when the connection means is fully made up which has a minimum and a maximum and is defined as follows:

the maximum gap=0.1056[exp((In D—0.8324)sq/4.134)];

the minimum gap=0.0000009562[exp((In D+14.16)sq/28.85)];

wherein D is the outer diameter of each of the conduits at the end of each of the conduits.

2. Connection means for connecting two conduits together with their axes coinciding with each other and with their ends opposing each other and compressing a seal between them, the connection means comprising in combination:

a pair of axially spaced conduit load shoulders formed on each conduit, each of the conduit load shoulders of each pair extending circumferentially around each of the conduits;

one of the conduit load shoulders of each pair having a conduit lead portion joining a conduit load portion, both conduit lead and conduit load portions being conical, the conduit lead portion being at a greater angle relative to a plane perpendicular to the axis of the conduit than the conduit load portion;

a clamp having two semi-circular halves for clamping the ends of the conduits together, each half of the clamp having two pairs of axially spaced clamp load shoulders for mating with the conduit load shoulders;

one of the clamp load shoulders of each pair of the clamp having a clamp lead portion joining a clamp load portion and configured at the same angles as and for mating with the conduit lead and load portions, respectively; and means for bolting the halves of the clamp together, for causing the conduit lead portions and clamp lead portions to slide on each other to move the ends of the conduits toward each other, then for causing the conduit load portions and clamp load portions to slide on each other to axially pre-load the ends of the conduits against each other and compress the seal.

3. Connection means for connecting two conduits together with their axes coinciding with each other and with their ends opposing each other and compressing a seal between them, the connection means comprising in combination:

axially spaced first and second conduit load shoulders formed on each conduit, each of the conduit load shoulders of each pair extending circumferentially around each of the conduits, the first conduit load shoulder of each conduit being spaced closer to the end of each conduit than the second conduit load shoulder;

the first conduit load shoulder of each conduit having a conduit lead portion joining a conduit load portion, both conduit lead and load portions being conical, the conduit lead portion being at a greater angle relative to a plane perpendicular to the axis of the conduit than the conduit load portion;

the second conduit load shoulder of each conduit being conical and having a depth that is less than the depth of the first conduit load shoulder;

a clamp having two semi-circular halves for clamping the ends of the conduits together, each half of the clamp having two sets of axially spaced first and second clamp load shoulders for mating with the first and second conduit load shoulders, respectively;

the first clamp load shoulder of each set of the clamp having a clamp lead portion joining a clamp load portion and configured at the same angles as the conduit lead and load portions, respectively;

the second clamp load shoulder of each set of the clamp being conical and having a depth that is less than the depth of the first clamp load shoulder; and means for bolting the halves of the clamp together, for causing the conduit and clamp lead portions to slide on each other to move the ends of the conduits toward each other, then for causing the conduit and clamp load portions to slide on each other to axially preload the ends of the conduits against each other and compress the seal.

4. Connection means for connecting an upper conduit onto a lower conduit with their axes being vertical and coinciding with each other and with their ends opposing each other and compressing a seal between them, the connection means comprising in combination:

axially spaced first and second conduit load shoulders formed on each conduit, each of the conduit load shoulders of each pair extending circumferentially around each of the conduits, the first conduit load shoulder of each conduit being spaced closer to the end of each conduit than the second conduit load shoulder;

the first conduit load shoulder of each conduit having a conduit lead portion joining a conduit load portion, both conduit lead and load portions being conical, the conduit lead portion being at a greater angle relative to a plane perpendicular to the axis of each of the conduits than the conduit load portion;

the second conduit load shoulder of each conduit being conical and having a depth that is less than the depth of the first conduit load shoulder;

a clamp having two semi-circular halves for clamping the ends of the conduits together, each half of the clamp having two sets of axially spaced first and second clamp load shoulders for mating with the first and second conduit load shoulders, respectively;

the first clamp load shoulder of each set of the clamp having a clamp lead portion joining a clamp load portion and configured at the same angles as and for mating with the conduit lead and load portions of the first conduit load shoulders;

the second clamp load shoulder of each set of the clamp being conical and having a depth that is less than the depth of the first clamp load shoulder;

means for bolting the halves of the clamp together, for causing the conduit and clamp lead portions to slide on each other to move the ends of the conduits toward each other, then for causing the conduit and clamp load portions to slide on each other axially preload the ends of the conduits against each other and compress the seal; and carrying means for mounting each half of the clamp to the upper conduit for allowing radial inward and outward sliding movement of each half relative to the conduits when bolting and unbolting the halves.

5. Connection means for connecting two conduits together with their axes coinciding with each other and with their ends opposing each other and compressing a seal between them, the connection means comprising in combination:

axially spaced first and second conduit load shoulders formed on each conduit, each of the conduit load shoulders of each pair extending circumferentially around each of the conduits and being separated from the other conduit load shoulder of the pair by a conical conduit flank, the first conduit load shoulder of each conduit being spaced closer to the end of each conduit than the second conduit load shoulder;

the first conduit load shoulder of each conduit having a conduit lead portion joining a conduit load portion, both conduit lead and load portions being conical, the conduit lead portion being at a greater angle relative to a plane perpendicular to the axis of the conduit than the conduit load portion;

the second conduit load shoulder of each conduit being conical and having a depth that is less than the depth cf the first conduit load shoulder;

a clamp having two semi-circular halves for clamping the ends of the conduits together, each half of the clamp having two sets of axially spaced first and second clamp load shoulders for mating with the first and second conduit load shoulders, respectively, each set of first and second clamp load shoulders being separated from each other by a conical clamp flank;

the first clamp load shoulder of each set of the clamp having a clamp lead portion joining a clamp load portion and configured at the same angles as and for mating with the conduit lead and load portions, respectively;

the second clamp load shoulder of each set of the clamp being conical and having a depth that is less than the depth of the first clamp load shoulder;

means for bolting the halves of the clamp together, for causing the conduit and clamp lead portions to slide on each other to move the ends of the conduits toward each other, then for causing the conduit and clamp load portions to slide on each other axially preload the ends of the conduits against each other and compress the seal; and each of the clamp flanks being spaced from each of the conduit flanks by a substantial gap when the connection means is fully made up.

6. Connection means for connecting an upper conduit onto a lower conduit with their axes being vertical and coinciding with each other and with their ends opposing each other and compressing s seal between them, the connection means comprising in combination:

a pair of axially spaced generally parallel conical conduit load shoulders formed on each conduit, each of the conduit load shoulders of each pair extending circumferentially around each of the conduits and being separated from the other conduit load shoulder of the pair by a conical conduit flank;

clamp having two semi-circular halves for clamping the ends of the conduits together, each half of the clamp having two pairs of axially spaced generally parallel conical clamp load shoulders for mating with the conduit load shoulders, each of the clamp load shoulders of each pair being separated from the other clamp load shoulder of the pair by a conical clamp flank;

means for bolting the halves of the clamp together for causing the clamp load shoulders to slide on the conduit load shoulders and draw the ends of the conduits toward each other, compressing the seal;

a pair of braces extending radially outward from the upper conduit on opposite sides of the upper conduit; and cooperating means for slidably mounting one of the halves of the clamp to each of the braces to allow the halves to slide radially inward and outward for bolting and unbolting the clamp.

7. The connection means according to claim 6 wherein each of the braces comprises a rod; and wherein the cooperating means comprises an aperture extending through each of the halves for receiving the rod.

8. The connection means according to claim 6 wherein each of the braces comprises a flange extending radially from the upper conduit; and wherein the cooperating means comprises a slot formed in each of the halves for receiving the flange.

*9. A conduit adapted to be connected to a tubular member with a connector member having a connector axis and a pair of connector shoulders which are movable radially inward relative to the connector axis, the conduit having a conduit axis coinciding with a tubular member axis of the tubular member and the connector axis, the conduit having an end which opposes end of the tubular member and compresses a seal between them the conduit comprising in combination:*

*axially spaced parallel first and second conduit load shoulders formed on and extending circumferentially around the conduit, the first conduit load shoulder being located closer to the end of the conduit than the second conduit load shoulder, each of the load shoulders having an inner edge and an outer edge which is radially outward of the inner edge relative to the conduit axis;*

*one of the conduit load shoulders having a lead portion at its outer edge joining a load portion which extends from its inner edge, both lead and load portions being conical, the lead portion being at a greater angle relative to a plane perpendicular to the conduit axis than the load portion and being positioned to be engaged by one of the connector shoulders prior to engagement of the other of the connector shoulders with the other of the conduit load shoulders, so as to move the ends of the conduit and tubular member toward each other before engagement of the other of the connector shoulders with the other of the conduit load shoulders.*

*10. The conduit according to claim 9 wherein the lead portion is located on the first conduit load shoulder.*

*11. The conduit according to claim 9 wherein:*

*the first conduit load shoulder has a greater dimension from the inner edge to the outer edge of the first conduit load shoulder than a dimension of the second conduit*

*load shoulder from an inner edge to an outer edge of the second conduit load shoulder; and*

*the lead portion is located on the outer edge of the first conduit load shoulder.*

*12. A connector for connecting a conduit to a tubular member, the conduit having a conduit axis coinciding with a tubular member axis of the tubular member, the conduit having an upper end which opposes a lower end of the tubular member and compresses a seal between them, the connector comprising in combination:*

*axially spaced parallel conduit upper and lower load shoulders formed on and extending circumferentially around the conduit each of the load shoulders having an inner edge and extending upward and outward to an outer edge which is located radially outward from the inner edge relative to the conduit axis, the conduit upper load shoulder being located closer to the upper end of the conduit than the conduit lower load shoulder and having a greater dimension from its inner edge to its outer edge than the conduit lower load shoulder, the load shoulders facing downward relative to the upper end of the conduit and outward relative to the conduit axis:*

*the conduit upper load shoulder having a lead portion at the outer edge of the upper load shoulder which joins a load portion, both lead and load portions being conical, the lead portion being at a greater angle relative to a plane perpendicular to the conduit axis than the load portion and facing downward and outward relative to the conduit axis; and*

*a connector member adapted to be carried by the tubular member, extending downward therefrom and encircling the conduit upper and lower load shoulders, the connector member having mating connector upper and lower load shoulders which face upward and inward relative to the conduit axis and which are inwardly movable relative to the connector member axis for engaging the conduit upper and lower shoulders, the lead portion of the conduit upper load shoulder being engaged by the upper load shoulder of the connector member prior to engagement of the lower load shoulders, moving the ends of the conduit and tubular member toward each other before the connector lower load shoulder enters into mating engagement with the conduit lower load shoulder.*

*13. The connection assembly according to claim 12 wherein the connector upper load shoulder has a mating lead portion and load portion.*

*14. A connector for connecting a conduit to a tubular member, the conduit having an axis coinciding with an axis of the tubular member, the conduit having an upper end which opposes a lower end of the tubular member and compresses a seal between them, the connector comprising in combination:*

*a pair of grooves, each having a base and defining axially spaced parallel conduit upper and lower load shoulders formed on and extending circumferentially around the conduit, each of the load shoulders having an inner edge joining the base of one of the grooves and extending upward and outward relative to the axis of the conduit to an outer edge, the conduit upper load shoulder being located closer to the upper end of the conduit than the conduit lower load shoulder and having a greater dimension from its inner edge to its outer edge than the conduit lower load shoulder, the load shoulders facing downward relative to the upper end of the conduit and outward relative to the axis of the conduit;*

*the conduit upper load shoulder having a lead portion at its outer edge which joins a load portion, both lead and load portions being conical, the lead portion being at a greater angle relative to a plane perpendicular to the axis of the conduit than the load portion and also facing downward relative to the upper end of the conduit and outward relative to the axis of the conduit;*

*a connector member having a lower portion encircling the conduit upper and lower load shoulders, the connector member lower portion having mating connector upper ad lower load shoulders protruding inward therefrom, which face upward and inward relative to the axis of the conduit, the connector upper load shoulder having a lead portion and a load portion configured at the same angles as the lead portion and load portion of the conduit upper load shoulder;*

*means for connecting an upper portion of the connector member to the tubular member; and*

*means for moving the connector upper and lower load shoulders inward into engagement with the conduit upper and lower load shoulders, causing the lead portions to slide on each other to move the ends of the conduit and tubular member toward each other prior to engagement of the load portions with each other and prior to engagement of the lower load shoulders with each other, then for causing the load portions to slide on each other and the lower load shoulders to engage each other to axially preload the ends of the conduit and tubular member against each other and compress the seal.*

*15. The connector according to claim 14 wherein:*

*the conduit upper and lower load shoulders are separated from each other by a conical conduit flank;*

*the connector member upper and lower load shoulders are separated from each other by a conical connector flank; and*

*the connector flank is spaced from the conduit flank by a substantial gap when the connector is fully made up.*

* * * * *

UNITED STATES PATENT AND TRADEMARK OFFICE

CERTIFICATE OF CORRECTION

PATENT NO. : Re. 35,533

DATED : June 17, 1997

INVENTOR(S) : Frank C. Adamek, Dag H. Zeiner-Gundersen

It is certified that error appears in the above-identified patent and that said Letters Patent is hereby corrected as shown below:

Column 8, Line 39, before "end" insert --an--;

Column 8, Line 40, before "the" insert --,--;

Column 10, Line 25, "ad" should be --and--.

Signed and Sealed this

Fourteenth Day of April, 1998

Bruce Lehman

*Attest:*

BRUCE LEHMAN

*Attesting Officer*

*Commissioner of Patents and Trademarks*